Patented Nov. 5, 1940

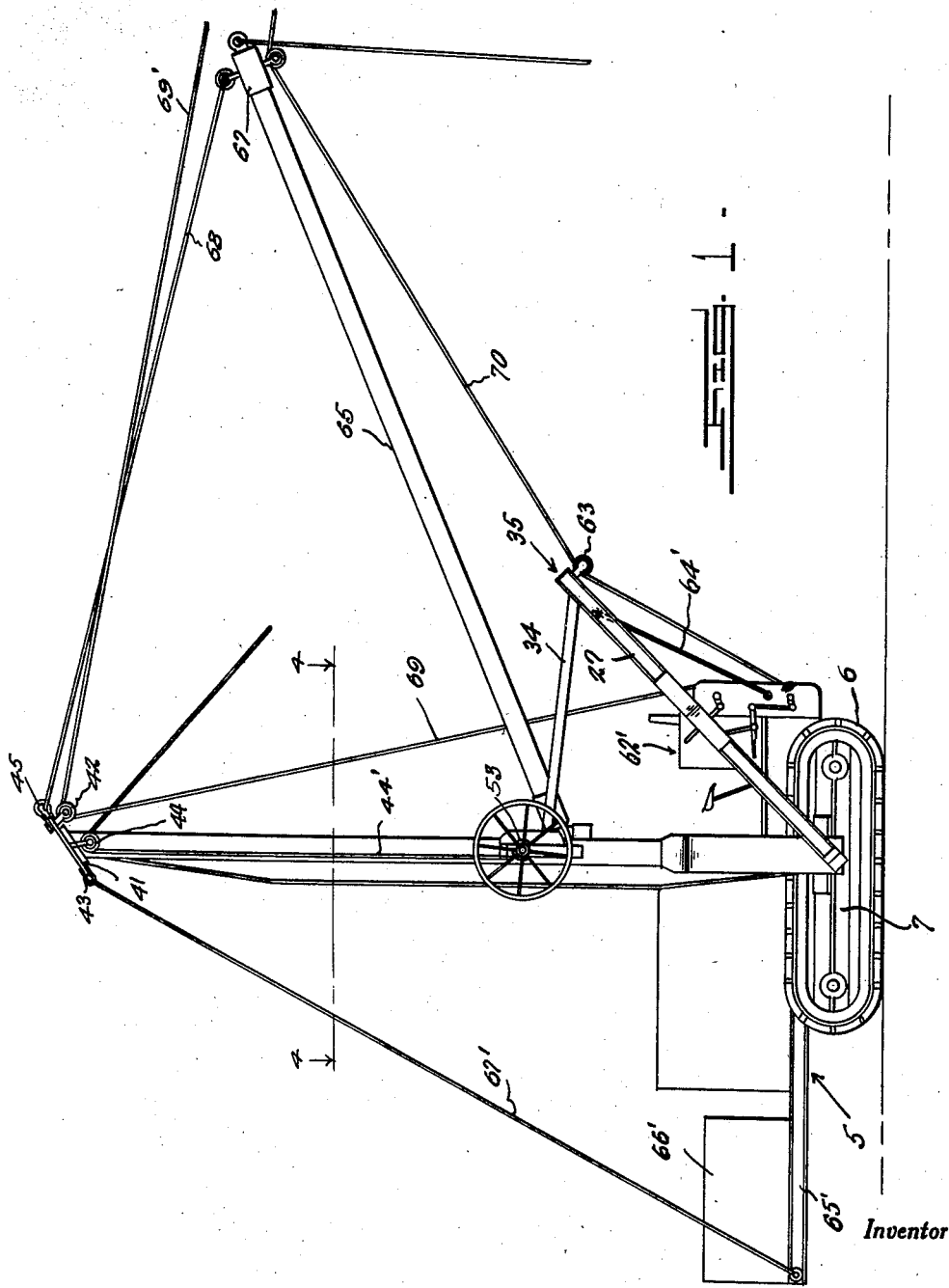

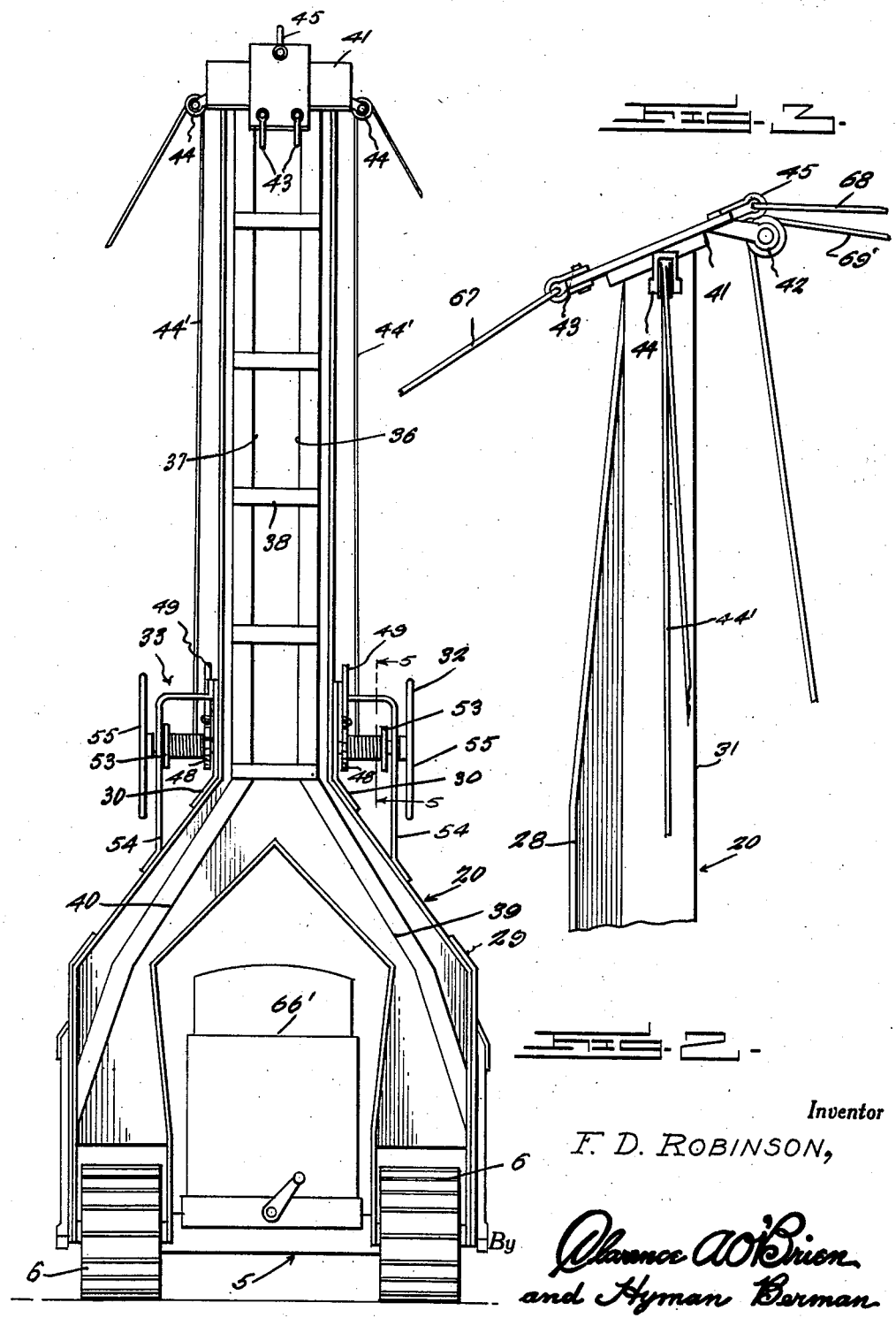

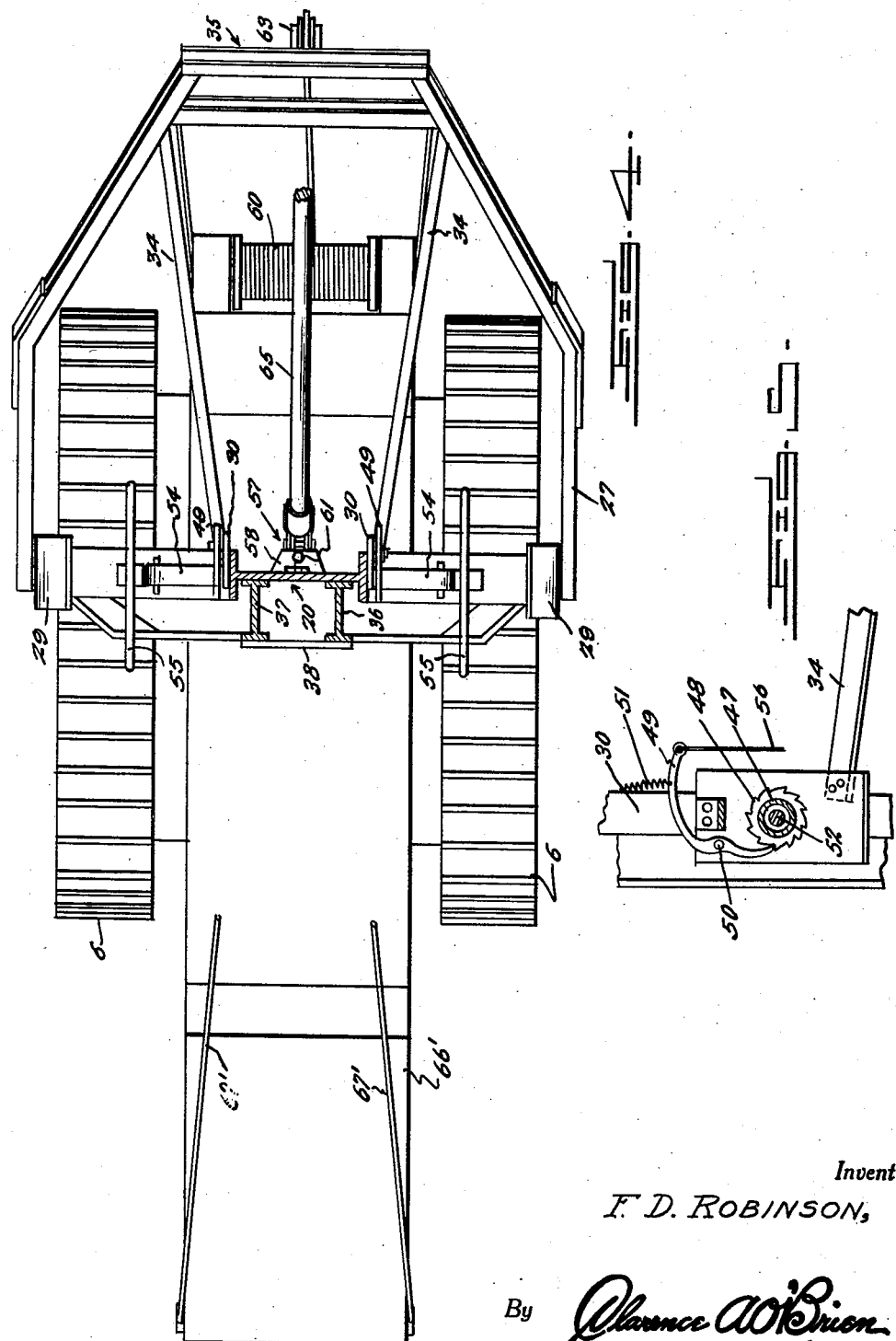

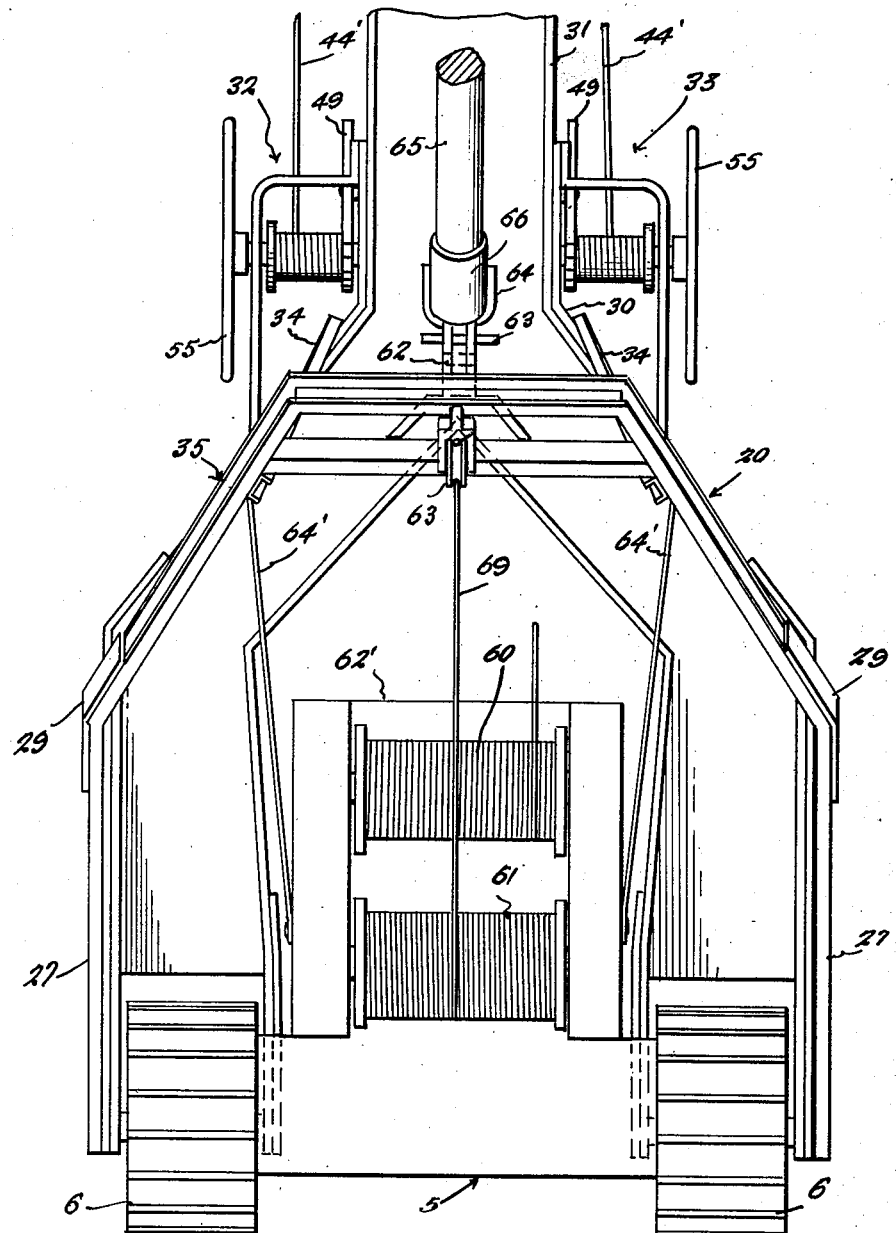

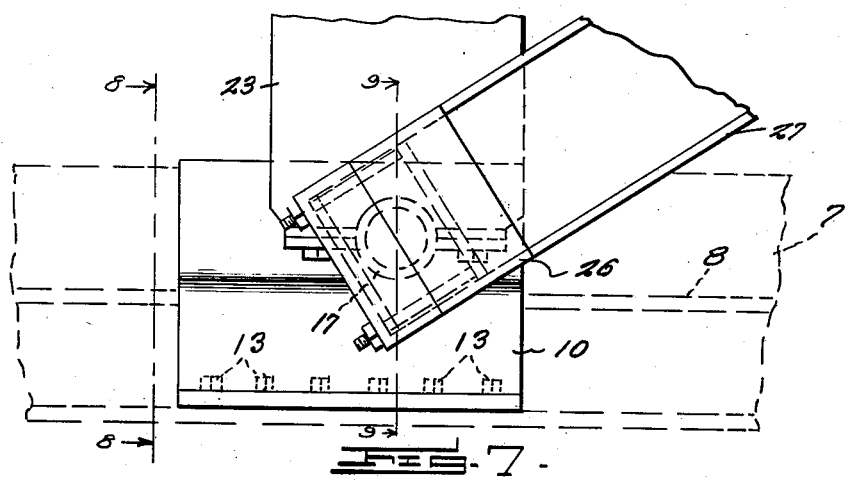
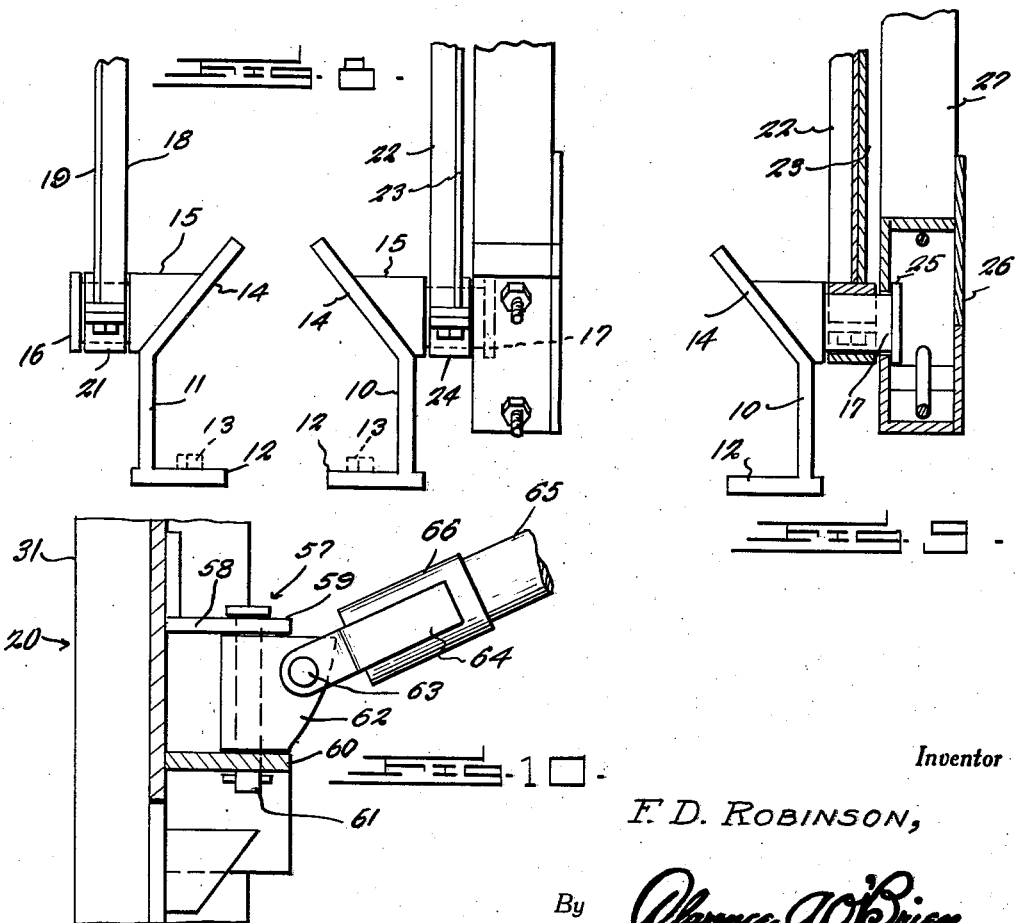

2,220,286

UNITED STATES PATENT OFFICE 2,220,286

LOADING AND TRANSPORTING DEVICE

Frank D. Robinson, Sandpoint, Idaho

Application December 7, 1939, Serial No. 308,083

8 Claims. (Cl. 212—65)

My invention relates to apparatus for loading, transporting, and unloading heavy objects, particularly logs and the like, and the principal object of the invention is to provide an improved apparatus of this character whereby the logs or the like may be easily lifted and arranged relative to a suitable support, hauled to their desired destination, and readily and speedily unloaded.

Another important object of my invention is to provide a simple and relatively inexpensive device of the character indicated which is characterized by an improved distribution of strains and supports, whereby a more efficient and long-lived apparatus is provided.

Other important objects and advantages of my invention will be apparent from a reading of the following description taken in connection with the appended drawings, wherein for purposes of illustration I have shown a preferred embodiment of my invention.

In the drawings:

Figure 1 is a general right hand side elevational view of the embodiment.

Figure 2 is an end elevational view, enlarged, and looking from left to right in Figure 1.

Figure 3 is an enlarged fragmentary side elevational view.

Figure 4 is an enlarged horizontal sectional view taken through Figure 1 approximately on the line 4—4 and looking downwardly in the direction of the arrows.

Figure 5 is an enlarged transverse vertical sectional view taken through Figure 2 approximately on the line 5—5 and looking toward the left in the direction of the arrows.

Figure 6 is an enlarged end elevational view partly broken away, and looking from right to left in Figure 1.

Figure 7 is a fragmentary side elevational detail partly in phantom line showing a box bearing construction.

Figure 8 is a fragmentary elevational view looking from left to right in Figure 7.

Figure 9 is a fragmentary transverse vertical sectional view taken through Figure 7 approximately on the line 9—9 and looking toward the right in the direction of the arrows.

Figure 10 is a fragmentary enlarged longitudinal vertical sectional view taken through the boom mounting.

In general the present embodiment of the invention consists of a Y frame acting as a spar which is adaptable to any type of tractor, and the device consists of an "A" type of fair-leads, boom seat, and butterfly, side guy cables, and counter-balance cables. Power is applied to a double drum tractor operated winch at the rear end. The main line cable runs through a block on the fair-leads, which act as a level-wind during operation, thence through another block at the end of the boom. The haul-back cable runs through a block at the top of the Y frame, this block being attached to the top of the Y frame by an eye bolt, and thence to the haul-back drum.

The Y frame is built of steel I-beams and flat iron lacings, and is especially mounted with bearing supports which are adaptable to any track type of tractor, these supports having bearings for the "A" type fair-leads. On each side of the Y frame above the juncture of the legs of the Y are hand winches which act as reels for the adjustable side guy cables. The cables run from the winches through blocks at the top of the Y frame and next to the anchors of any suitable type, and prevent tipping of the machine during its operation. The construction of the Y frame provides a place of attachment for the side guy blocks, counter-balance guys and haul-back blocks, and the boom line, the latter being in the same plane. The boom seat is situated above the juncture of the legs of the Y frame and consists of a shelf and a top brace for the boom butterfly pin, the seat being on the hoist side of the mast. The fair-leads are of double steel channel construction and are supported by the bearing supports which have special boxings at the foot to prevent side-sway, end pull and thrust. The butterfly carries the boom thrust to the mast and allows for the raising and lowering of the boom in addition to its swing. The fair-leads braces prevent the fair-leads from swinging the main line block from the plane of the winches and keeps the cable in a level wind. The recoil guys running from the bend of the fair-leads to the winch prevent the Y frame from tipping backwards if the load is suddenly reduced.

Referring in detail to the drawings, the numeral 5 generally designates the chassis frame of the tractor including the track-type elements 6 which are mounted on the horizontal flange members 7 which include the flange 8 on the opposite sides thereof, which opposite sides are engaged by supports 10 and 11, respectively, herein referred to as bearing supports, which include respective feet 12 for bolting as indicated by the numerals 13 on the top of the flanges 8, with the upper parts of the supports leaning toward each other as indicated by the numeral 14 in Figure 8, the opposite sides of these upper portions being provided with journal supports 15 carrying the journals 16 and 17 which are flanged at their outer ends. The supports 10 and 11 are easily adapted to any type of track tractor, so that the device of the invention as a whole may be readily mounted on any suitable available tractor and shipped and sold separate from the tractor, thereby reducing the cost of providing and maintaining a device in accordance with the present invention. As indicated in Figure 8, one flange 18 on one of the depending feet of one leg of the Y frame 20 and a reinforcing strap 19, have in common a journal bearing 21 mounted on the journal 16, and a similar arrangement including the elements 22 and 23 of the remaining depending foot have the journal bearing 24 engaged with the journal 17. The journal 17 projects also, as shown in Figure 9, through the opening 25 in a box-type bearing 26 on the lower end of the fork leg 27.

The Y frame 20 is constructed of I-beam, shaped by bending, and jointing, and is provided with back bracing with I-beam as indicated by the numeral 28, beveled and bent to fit, thereby reinforcing the main frame for back pressure in cooperation with plating such as indicated by the numeral 29 on the sides of the Y frame both inside and out and on the depending legs thereof, from the trunnions or journals 16 and 17 up over the first bend of the legs of the forks, with a second set of plates 30 covering the second bend of the legs, overwise described as the juncture of the legs with the standard portion 31 of the Y frame. This second set of plates 30 also forms the seat for the side guying winches 32 and 33, respectively, and in addition these plates 30 form a base for attachment of the channel iron running from the Y frame to the fair-leads as indicated by the numeral 34, all joints being preferably electric welded. The flat plating and the back pressure I-beams are welded to another I-beam to make a rigid frame 35 which includes the legs 27. Two I-beams run parallelly from each edge of the main frame and are spaced apart with cross straps 38 and welded at intervals from the point of juncture of the legs of the Y frame with the standard thereof, the laterally spaced I-beams being designated by the numerals 36 and 37 respectively, in Figure 2 of the drawings. The straps 38 conveniently form steps of a ladder enabling reaching the top of the frame by climbing.

The laterally divergent portions 39 and 40 of the last-mentioned I-beams set down over the tracks of the tractor and join the trunnions or journals 16 and 17 by the means already described. This attachment of the legs of the Y frame to the trunnions by means of the boxing described provides flexibility and gives more independent tractor action while traveling over the surface of the ground.

On the top of the standard 31 of the Y frame is a cross plate 41 of heavy flat steel welded to the extreme upper end of the standard of the Y frame with each end extending laterally beyond the two sides of the front and rear of the Y frame. On the front side is mounted the boom clevis 42 while the rear edge has connected thereto two balance guys 43, with the opposite sides drilled for respective side guy blocks 44. The center of the front edge of the said plate carries a swivel which supports a block 45 for the haul back line 46.

Both of the similar side guy winches 32 and 33 have the drum part 47 of hollow pipe with the end next to the Y frame closed by a ratchet disk 48 which has a ratchet pawl 49 pivoted on the side plate 30 as indicated by the numeral 50 together with a spring 51 to operate the pawl in engagement with the ratchet teeth to hold the drum from turning. At the opposite end of the hollow shaft is fixed a flange 53 between which and the ratchet wheel the cable is confined. A solid shaft 52 extends through the center of the inner and outer plate and is welded solid to form a solid unit with ends of the shaft extending from the drum with one end entering a recess in the side plate 30 and the opposite and outer end extending through a bracket 54 which is secured to the side of the frame as indicated in Figure 2, the laterally outward end being squared to hold the wheel 55 for operating the winch, the member 54 being bolted in place to permit easy removal for repair purposes. A cable 56 is provided for releasing the dog or pawl 49.

The boom seat which is generally designated 57 and is shown in detail in Figure 10 is mounted on the front of the Y frame above the juncture of the legs with the standard portion thereof, and comprises a U-shaped bracket 58 which is welded to the web of the standard 31, the opposite lateral extremities of the bracket 58 being welded to the flanges of the standard with plating reinforcement, said bracket including the upper and lower members 59 and 60 which are traversed by a pivot pin 61 which forms a pivot for the boom swivel 62 and is traversed by the boom pin 63 which is attached by suitable bracket means 64 to the lower or inner end of the boom 65. The swivel 62 is in the form of a butterfly wing-shaped part. The attaching means 64 is connected to the lower boom boot 66 while an upper boot 67 similar in construction to the lower boot is secured on the upper end of the boom. The upper boot is built like the lower boot but is capped at the top and with cross straps drilled at each end and bent to give a straight pull on the strap by the boom guy on the top and the main line block on the bottom.

The fair-leads 35 is built in the form of an arch extending directly over the drums and seated on the outside journals 16 and 17 as already described, the box-type bearings 26 being arranged to take the direct pull and side thrust of the fair-leads. Directly over the center of the main line drums 60 and 61, respectively, which are located in the housing 62 on the front end of the tractor chassis frame in front of the Y frame 20, the center of the crossbar of the fair-leads is provided with a swivel pulley 63. Attached to each side member of the arch 35 are guy cables 64' which are attached to the side members thereof to the housing 63 in a position to prevent the arch 35 from tilting backwardly toward the Y frame 20.

The chassis frame 5 is extended forwardly as indicated by the numeral 65' to hold a counterbalance 66' adjacent which there are attached the lower legs of counterbalance or hold back guy lines 67' which are attached to the top of the Y frame as already indicated.

To assemble the parts described and thread them with cable ready for operation, the Y frame is set upright on the tractor and fastened to the tractor by bolting the boxings in place on the journals 16 and 17. The fair-leads 35 are set over the tractor and fastened by bolting the boxings on the lower ends of the legs thereof on the said journals. The cables are fastened to the angle irons on the sides of the winch hoist and to the fair-leads long enough to let the fair-leads rise to a position directly over the main line drums. The two channel irons which are fastened to the fair-leads and extend to the Y frame are bolted in place, then the two cables are run from the top of the Y frame down to the counterbalance. These cables run from the winch hoists to the fair-leads at the back of the tractor and the cables run from the Y frame down to the front of the tractor or counterbalance portion to hold the Y frame and the fair-leads in position. Next the cables from the side guy winches are run through the blocks at the top of the Y frame and out to a dead man (not shown) on each side of the apparatus to prevent the Y frame from any sway sidewise while in operation or from tipping ahead. A guy cable 68 runs from the top of the Y frame to the upper end of the boom 65 and holds the boom in approximate thirty degree angle with respect to the ground. A tail line 69' runs from the top of the Y frame to a dead man (not shown) to keep the boom from swinging during the skidding operation. The main line 70 runs up from the drums through the fair-leads block 63 and up through the block at the upper end of the boom and out into the woods. The haul back line 70 leaves the other one of the drums 60, 61, respectively, goes up through the block 42 at the top of the Y frame and out into the woods through another block attached to the dead man (not shown) and hooks to the end of the main line following the log into deck, so as to pull the main line back into the woods.

The described device is compact, has a portable high lead which can be moved from place to place over rough ground, snow, or icy roads and set up in working condition in a relatively short period of time, and does away with the need for spar trees, unnecessary guys and the swamping of trails such as required for ordinary skidders and the like. When the operations are finished the device can be removed from the tractor, thereby leaving the tractor free to be used for other purposes.

Although I have shown and described herein a preferred embodiment of my invention, it is to be understood that I do not desire to limit the application of my invention thereto, except as may be required by the scope of the subjoined claims.

Having described the invention, what is claimed as new is:

1. In combination, a tractor frame ground engaging tracks on the opposite sides of said frame, said tracks having horizontal elements, trunnion brackets removably attached to the inner and outer sides of said horizontal elements, said trunnion brackets having corresponding trunnions projecting on opposite sides of the related track, a Y-frame including a standard portion and two divergent legs, each leg having a pair of laterally spaced feet depending therefrom and journaled on the trunnions on the opposite sides of the corresponding track, an arch-shaped fair leads supporting frame projecting to the rear of said Y-frame, the lower ends of the legs of said arch-shaped frame having boxings journaled on the laterally outwardly positioned trunnion in a position laterally outwardly from the foot of the Y-frame by corresponding thereto, a boom seat on the rear of said Y-frame above the tractor, a boom swivelly connected at its lower end to said boom seat.

2. In combination, a tractor including ground engaging tracks having horizontal elements on opposite sides of the tractor, trunnion brackets removably attached to said horizontal elements, said trunnion brackets having trunnions projecting on opposite sides of the related track, a Y-frame including a standard portion and two divergent legs, said legs each having a pair of laterally spaced feet depending therefrom and journaled on the trunnions on the opposite sides of each track, an arch-shaped frame disposed to the rear of said Y-frame, boxings on the lower ends of the legs of said arch-shaped frame journaled on the laterally outward trunnion of each pair, a boom seat on the rear of said Y-frame above the tractor, a boom swivelly connected at its lower end to said boom seat, a pair of main drums on said tractor to the rear of said Y-frame, a boom line on one of said drums and operatively engaged with the upper part of said Y-frame and fixed to the outer end of the boom, a main line on the other drum and operatively connected with said arch-shaped frame and passing to the rear for connection to the load, and means connected between the Y-frame and said arch-shaped frame and holding the latter in a rearwardly inclined position.

3. In combination, a tractor frame ground engaging tracks on the opposite sides of said tractor frame, said tracks having horizontal elements inner and outer, trunnion brackets removably attached to each horizontal element, said trunnion brackets having trunnions projecting on opposite sides of the related track, a Y-frame including a standard portion and two divergent legs, said legs each having a pair of laterally spaced feet depending therefrom and journaled on the inner and outer trunnions on the opposite sides of the corresponding track, an arch-shaped frame projecting rearwardly from said Y-frame, boxings on the lower ends of the legs of said arch-shaped frame, said boxing being journaled on the laterally outward trunnion of each track at a point laterally outwardly of the corresponding leg of the Y-frame, a boom seat on the rear of said Y-frame substantially on a level with the top of said arch-shaped frame, a boom swivelly connected at its lower end to said boom seat, and react means connected between the upper part of said arch-shaped frames and said Y-frame at a point adjacent to said boom seat.

4. In combination, a tractor including ground engaging tracks on opposite sides of the tractor, each track having a horizontal element, a pair of trunnion brackets for removable attachment to each of said horizontal elements, said trunnion brackets having axially aligned trunnions projecting on opposite sides of the related track, a Y-frame including a standard portion and two divergent legs, each of said legs having a pair of laterally spaced feet depending therefrom at opposite sides of the related track and journaled on the trunnions on the opposite sides of the track, an A-shaped frame projecting rearwardly from said Y-frame, boxings on the lower ends of the legs of said arch-shaped frame journaled on the outer of said trunnions and at the laterally outward side of the corresponding feet of the Y-frame, portions of said outer trunnions and of said boxing and feet of the Y-frame cooperating to prevent substantial lateral movement of said boxings and feet relative to the outer trunnions.

5. In combination, a tractor including ground engaging tracks having horizontal elements on opposite sides of the tractor, trunnion brackets removably attached to said horizontal elements, said trunnion brackets having trunnions projecting on opposite sides of the related track, a Y-frame including a standard portion and two divergent legs, said legs each having a pair of laterally spaced feet depending therefrom and journaled on the trunnions on the opposite sides of each track, an arch-shaped frame disposed to the rear of said Y-frame, boxings on the lower ends of the legs of said arch-shaped frame journaled on the laterally outward trunnion of each pair, a boom seat on the rear of said Y-frame above the tractor, a boom swivelly connected at its lower end to said boom seat, said Y-frame being composed of I-beam with a pair of laterally spaced I-beam vertical braces extending along the web of said standard and the webs of the legs of said Y-frame.

6. In combination, a tractor including ground engaging tracks having horizontal elements on opposite sides of the tractor, trunnion brackets removably attached to said horizontal elements, said trunnion brackets having trunnions projecting on opposite sides of the related track, a Y-frame including a standard portion and two divergent legs, said legs each having a pair of laterally spaced feet depending therefrom and journalled on the trunnions on the opposite sides of each track, an arch-shaped frame disposed to the rear of said Y-frame, boxings on the lower ends of the legs of said arch-shaped frame journaled on the laterally outward trunnion of each pair, a boom seat on the rear of said Y-frame above the tractor, a boom swivelly connected at its lower end to said boom seat, said Y-frame being composed of I-beam with a pair of laterally spaced I-beam vertical braces extending along the web of said standard and the webs of the legs of said Y-frame, cross-members connected to and between said braces.

7. A loading and carrying attachment for a tractor comprising a chassis having tracks on its opposite sides, each track including a horizontal element within the ellipse of the track, a vertical spar having depending legs reaching on opposite sides of said chassis, said legs each comprising laterally spaced feet depending at the inner and outer sides of the corresponding tracks, a pair of brackets rearwardly attached to the inner and outer sides of each of said horizontal elements, trunnions on the brackets on which the lower ends of said feet are rockably mounted, a fair lead having legs with their lower ends coaxially pivoted on the outer trunnions outside of the feet of the spar, said fair lead projecting rearwardly at an inclined angle from said spar and having a sheave on its upper part, a boom pivoted on the rear side of said spar at a point substantially on a lure with the upper part of said fair leads, a block at the upper and outer end of the boom, a main cable passing through said block and through said sheave, and a winch on said chassis beneath the upper part of said fair leads to which said main cable is operatively connected.

8. A loading and carrying attachment according to claim 7 wherein relatively rigid horizontal braces are connected between said spar and the upper part of said fair leads.

FRANK D. ROBINSON.